(12) United States Patent
Flick et al.

(10) Patent No.: US 11,686,405 B2
(45) Date of Patent: Jun. 27, 2023

(54) GAS VALVE WITH EMERGENCY SHUTOFF AND MECHANICAL TIMER

(71) Applicant: Skytech Products Group, Fort Wayne, IN (US)

(72) Inventors: Christopher Flick, Angola, IN (US); Jih Ching Lai, Taichung (TW)

(*) Notice: Subject to any disclaimer, the term of this patent is extended or adjusted under 35 U.S.C. 154(b) by 565 days.

(21) Appl. No.: 16/717,613

(22) Filed: Dec. 17, 2019

(65) Prior Publication Data

US 2020/0124203 A1    Apr. 23, 2020

Related U.S. Application Data

(62) Division of application No. 15/072,017, filed on Mar. 16, 2016, now Pat. No. 10,520,108.

(51) Int. Cl.

| F16K 31/48 | (2006.01) |
|---|---|
| F16K 1/12 | (2006.01) |
| F23N 1/00 | (2006.01) |
| F23N 5/24 | (2006.01) |

(52) U.S. Cl.
CPC .............. *F16K 31/485* (2013.01); *F16K 1/12* (2013.01); *F23N 1/002* (2013.01); *F23N 5/247* (2013.01); *F23N 2231/30* (2020.01)

(58) Field of Classification Search
None
See application file for complete search history.

(56) References Cited

U.S. PATENT DOCUMENTS

| 1,952,332 A | 3/1934 | Partlow |
|---|---|---|
| 3,529,584 A | 9/1970 | Celaya |
| 4,924,763 A | 5/1990 | Bingham |
| 5,094,259 A | 3/1992 | Hsu |
| 5,975,574 A | 11/1999 | Warth |
| 6,032,663 A | 3/2000 | Pencheon |
| 6,755,213 B1 | 6/2004 | Lai |
| 7,263,934 B2 | 9/2007 | Copeland et al. |
| 7,568,909 B2 | 8/2009 | MacNutt et al. |
| 8,100,121 B2 | 1/2012 | Clauss et al. |
| 8,720,267 B2 | 5/2014 | Al-Buaijan |
| 8,757,437 B2 | 6/2014 | Schneider |
| 9,068,752 B2 | 6/2015 | Shaffer et al. |
| 2004/0183042 A1 | 9/2004 | Invernizzi |
| 2008/0018484 A1 | 1/2008 | Sager |
| 2008/0251064 A1 | 10/2008 | Bellomo |
| 2011/0146649 A1 | 6/2011 | Brenner |
| 2014/0230661 A1 | 8/2014 | Stilo et al. |
| 2015/0276230 A1 | 10/2015 | Chen |

FOREIGN PATENT DOCUMENTS

| DE | 26 53 343 A1 | 4/1978 |
|---|---|---|
| KR | 20-0477877 | 7/2015 |
| WO | 94/01722 | 1/1994 |

*Primary Examiner* — Jason Lau
(74) *Attorney, Agent, or Firm* — Taylor IP, P.C.

(57) ABSTRACT

A mechanical valve assembly for the control of a gas flow to a gas appliance. The mechanical valve assembly includes at least one input knob movably connected to a housing, a shaft assembly connected to at least one input knob, and a manually-operated valve located inside the housing and in between the inlet port and the outlet port. The manually-operated valve is mechanically connected to the shaft assembly, and the manually-operated valve is configured for opening and closing a gas flow between the inlet port and the outlet port.

5 Claims, 6 Drawing Sheets

GAS VALVE WITH EMERGENCY SHUTOFF AND MECHANICAL TIMER

CROSS REFERENCE TO RELATED APPLICATIONS

This is a divisional of U.S. patent application Ser. No. 15/072,017, entitled "GAS VALVE WITH EMERGENCY SHUTOFF AND MECHANICAL TIMER", filed Mar. 16, 2016, which is incorporated herein by reference.

BACKGROUND OF THE INVENTION

1. Field of the Invention

The present invention relates to mechanical devices for the control of a gas flow, and, more particularly, to a mechanical valve assembly utilized therein.

2. Description of the Related Art

In many applications, a flow of gas is required to operate various appliances. Some appliances, for example, include fireplaces, stoves, ovens, furnaces, heaters, etc. Because of inherent sudden and/or unforeseen circumstances surrounding the use of such apparatuses, it is desired to be provided with a way of controlling the gas flow in general, and shutting off the gas flow in particular.

It is known in the art to have separate valves for controlling gas flow: a primary valve that is used to turn on and off the gas flow in normal operations, and a separate electrically-operated valve to shut off the gas flow. The latter valve is sometimes referred to as an "emergency shut-off" valve. The function of the emergency shut-off valve is to completely stop the flow of gas to the appliance until various courses of action are taken.

Depending upon the types of valves and the applications in which they are used, various problems can be encountered. One problem is the reliance of the emergency shut-off valve upon electricity. In an urgent situation where the power source may be unreliable or completely absent, the emergency valve would fail to operate and thereby allow the gas flow to continue unabated. Further, an electrical connection may not be reliable and prone to disruption.

Another problem that can be encountered is the distance between the two valves. If the emergency shut-off valve is at a distance from the primary valve, there may be a lag in the time an urgent situation is noted and the emergency shut-off valve is actuated. Furthermore, the distance can create more opportunities for failure as a result of additional conduits, wiring, etc. between the two valves.

What is needed in the art is an apparatus to reliably shut off a timed flow of gas in an urgent situation.

SUMMARY OF THE INVENTION

The present invention is directed to an improved mechanical valve assembly incorporating features that enable it to allow a timed gas flow as well as interrupt the gas flow, whether or not the timed gas flow is in operation.

The present invention provides a mechanical valve assembly with a time-controlled valve to allow a gas flow through the mechanical valve assembly for a predetermined time. A mechanical valve assembly with an emergency shut-off valve is positioned ahead of the timer-controlled valve relative to a direction of the gas flow through the mechanical valve assembly to interrupt a gas flow through the mechanical valve assembly.

The present invention further provides a mechanical valve assembly for the control of a gas flow to a gas appliance. The mechanical valve assembly includes a housing, a gas inlet port associated with the housing, a gas outlet port associated with the housing, at least one input knob movably connected to the housing, a shaft assembly connected to the at least one input knob, and a manually-operated valve located inside the housing and in between the inlet port and the outlet port. The manually-operated valve is mechanically connected to the shaft assembly. The manually-operated valve is configured for opening and closing a gas flow between the inlet port and the outlet port.

The present invention further provides a mechanical valve assembly with a shaft assembly operable by both the time-controlled valve as well as the emergency shut-off valve.

An advantage of the present invention is that the operation of the timer-controlled valve, emergency shut-off valve, and shaft assembly is purely of a mechanical nature and does not require electronics to function.

Another advantage of the present invention is the emergency shut-off valve is capable of interrupting a gas flow whether or not the timer-controlled valve is in operation.

Yet another advantage of the present invention is the emergency shut-off valve must be depressed and simultaneously rotated to allow gas flow, thereby serving as a safety device.

Still another advantage of the present invention is that the timer-controlled valve and the emergency shut-off valve are located proximate to each other in the housing and operate the same valve, thereby eliminating components and making access and operation easier.

Yet another advantage is as a result of the timer-controlled valve and the emergency shut-off valve having separate locations in the same mechanical valve assembly, the gas flow can be shut off by either valve; that is, there is less risk than would be encountered if the two valves were located on the same working shaft, for example.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

Figure 1:
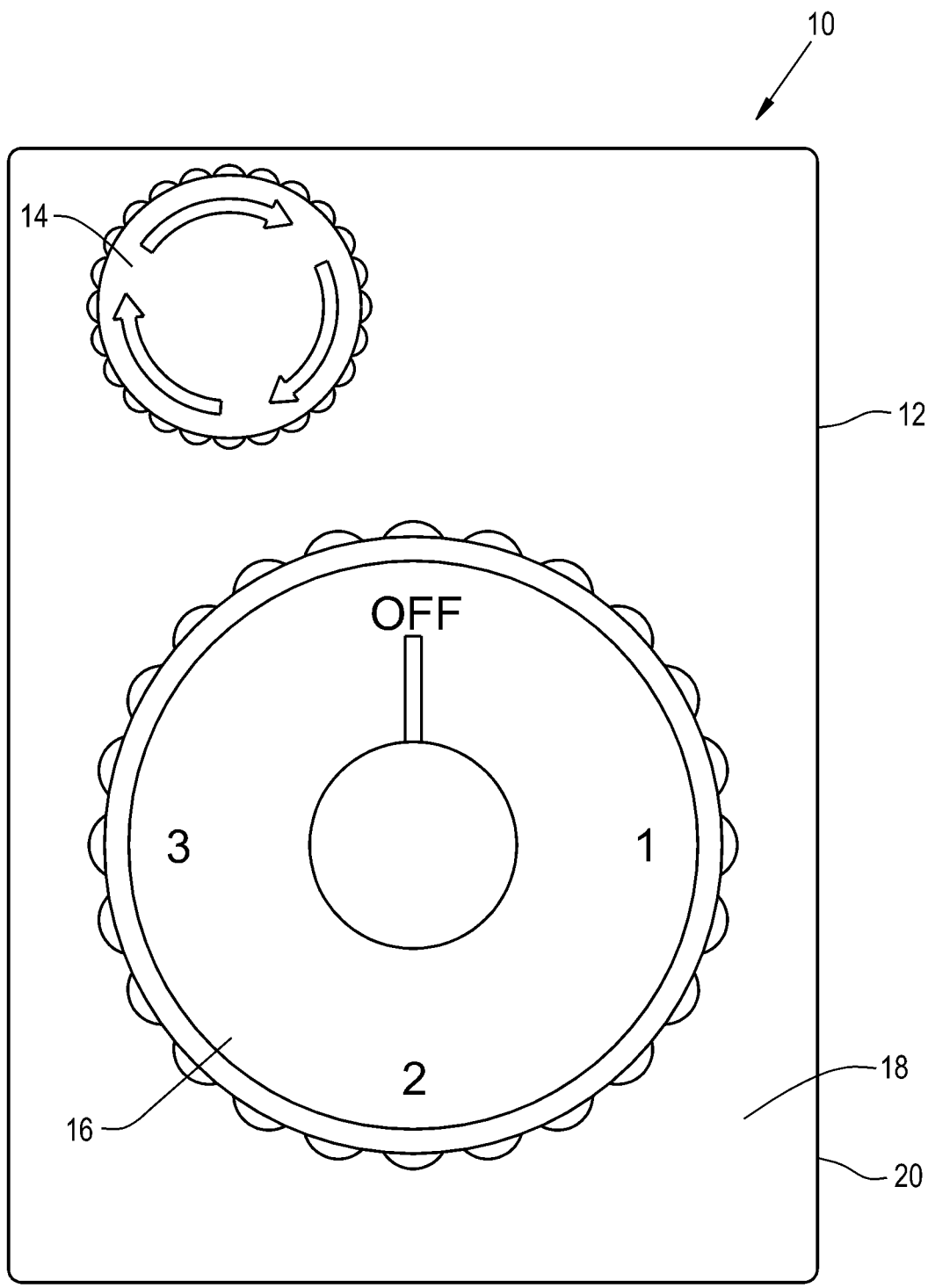
FIG. 1 is a perspective view of an embodiment of a mechanical valve assembly of the present invention.
Figure 2:
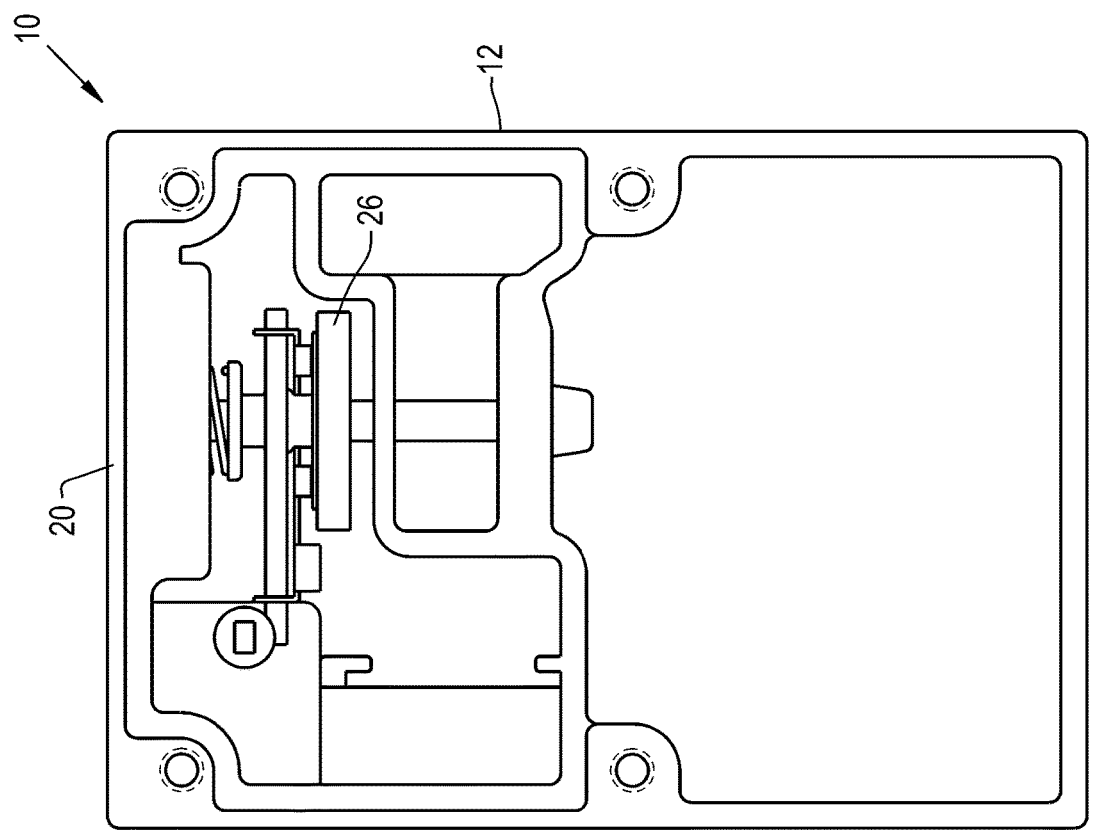
FIG. 2 is a top view of the mechanical valve assembly of FIG. 1 in two parts.
Figure 2:
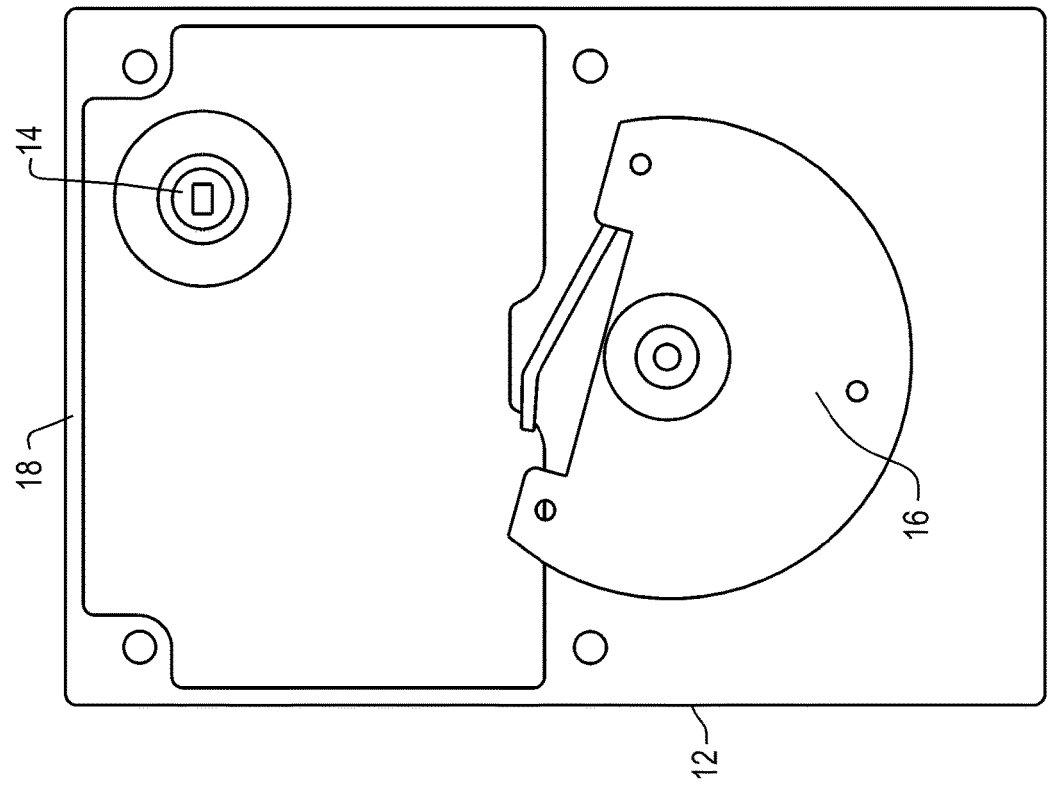

Referring now to FIGS. 1-2, there is shown an embodiment of a mechanical valve assembly 10 according to the present invention. Mechanical valve assembly 10 includes housing 12, emergency shut-off valve 14, timer-controlled valve 16, and shaft assembly 26. It is to be understood that the spatial relationship between emergency shut-off valve 14 and timer-controlled valve 16, as well as their respective locations on mechanical valve assembly 10, may vary from the embodiment shown in FIG. 1 without changing the scope of the invention.

FIG. 2 shows the housing 12 of mechanical valve assembly 10 disassembled into two sections: cover plate 18, and base 20. Screws or other fasteners used to removably join cover plate 18 to base 20 are not shown.

Figure 3:
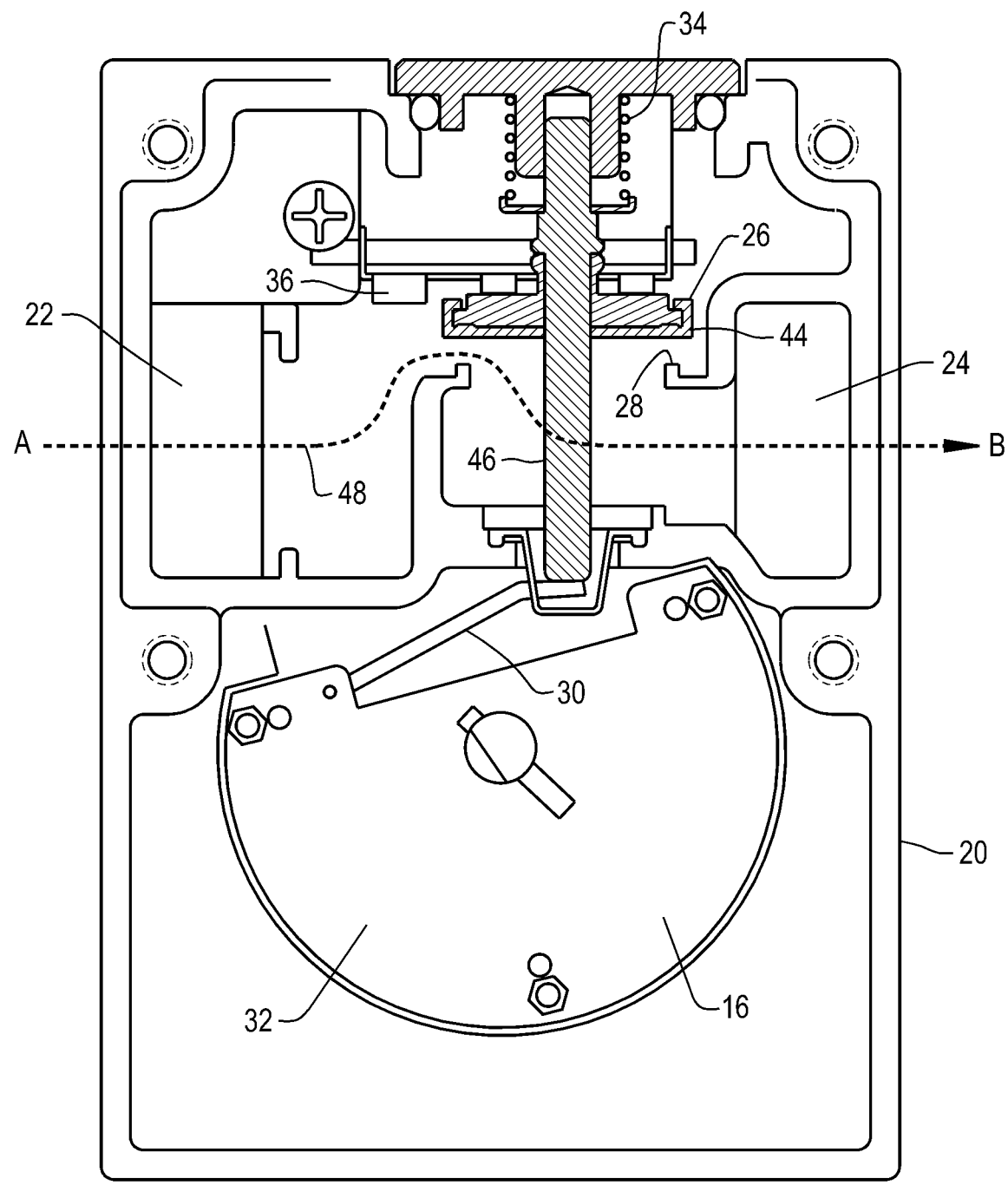
FIG. 3 is a top sectioned view of the mechanical valve assembly of FIG. 1 with selected components, showing gas flowing in an ON condition.

Now referring to FIG. 3, base 20 of mechanical valve assembly 10 is shown with selected components, showing gas flowing in an ON condition. Base 20 includes gas inlet port 22, gas outlet port 24, and seat 28. As shown, it is to be understood that the ON position signifies gas 48 is able to flow unobstructed from gas inlet port 22 to gas outlet port 24 (from A to B). Shaft assembly 26 includes spring 34, seal 44 and shaft 46. Gas 48 is able to flow unobstructed from gas inlet port 22 to gas outlet port 24 because while in the ON position, seal 44 of shaft assembly 26 is not resting on seat 28 of base 20. Seal 44 of shaft assembly 26 is not resting on seat 28 of base 20 because timer-controlled valve 16, which includes timer mechanism 32 and activation bar 30, is in an ON position and has been set to a predetermined time for gas to flow through mechanical valve assembly 10. Until the predetermined time has expired, activation bar 30 displaces slidably attached seal 44 on shaft 46 of shaft assembly 26 from seat 28 of base 20 while simultaneously compressing spring 34.

In the ON condition shown in FIG. 3, emergency shut-off valve 14 is also in an ON position (see FIG. 5A), the details of which are described in detail later in this specification. Spring plate 36, pivotally mounted in base 20, is undisplaced.

Figure 4:
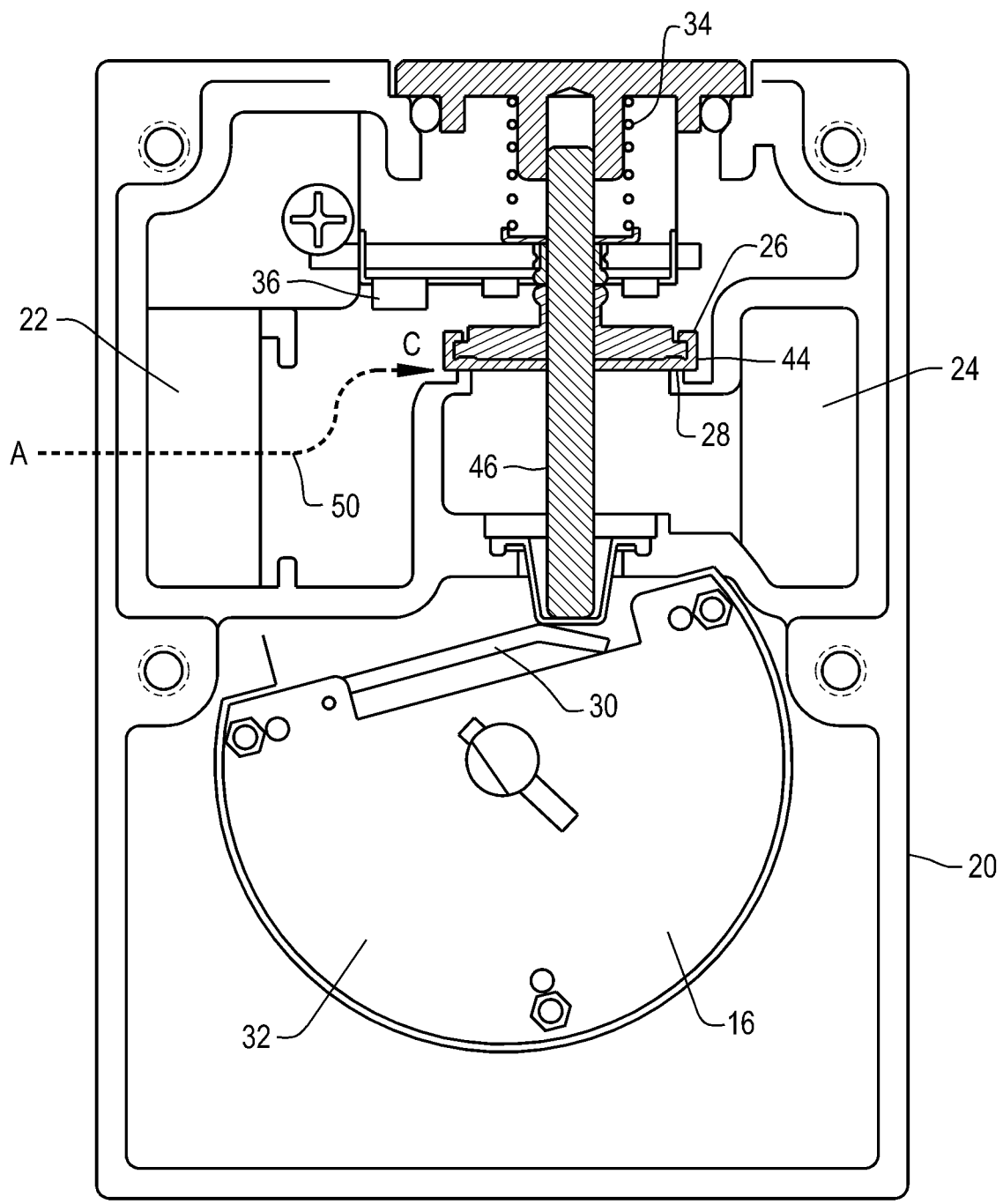
FIG. 4 is a top sectioned view of the mechanical valve assembly of FIG. 1 with selected components, showing an OFF condition with no gas flowing.

Now referring to FIG. 4 with continued reference to FIG. 3, base 20 of mechanical valve assembly 10 is shown with selected components, showing gas flowing in an OFF condition. As shown, it is to be understood that the OFF position signifies gas 50 is not able to flow unobstructed from gas inlet port 22 to gas outlet port 24 (from A, stopping at C). Gas is not able to flow unobstructed from gas inlet port 22 to gas outlet port 24 because while in the OFF position, seal 44 of shaft assembly 26 is resting on seat 28 of base 20. Seal 44 of shaft assembly 26 is resting on seat 28 of base 20 because timer-controlled valve 16 is in an OFF position either because it was manually put into that position, or because a predetermined time for gas to flow through mechanical valve assembly 10 has expired. When timer-controlled valve 16 is in the OFF position, activation bar 30 does not displace shaft 46 of shaft assembly 26, thereby allowing spring 34 to decompress and urge seal 44 on shaft 46 of shaft assembly 26 to contact seat 28 of base 20.

In the OFF condition shown in FIG. 4, emergency shut-off valve 14 is in an ON position (see FIG. 5A), the details of which are described in detail later in this specification. As is the case when timer-controlled valve 16 is in the ON position, spring plate 36 is undisplaced.

Figure 5A:
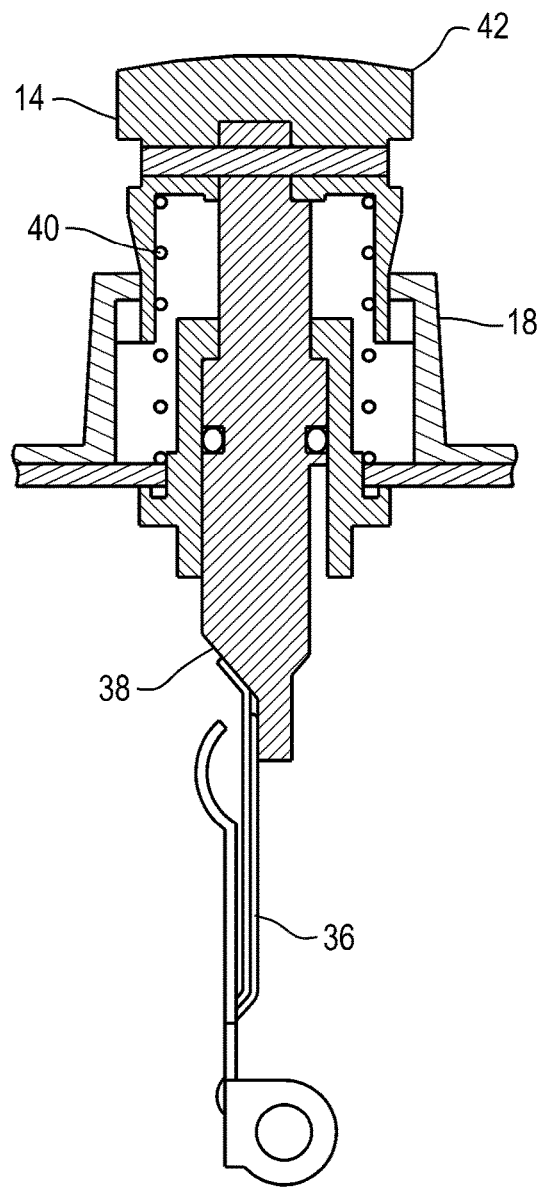
FIG. 5A is a sectioned side view of a portion of an emergency shut-off valve of the mechanical valve assembly of FIG. 1 in an ON position to allow gas flow.
Figure 5B:
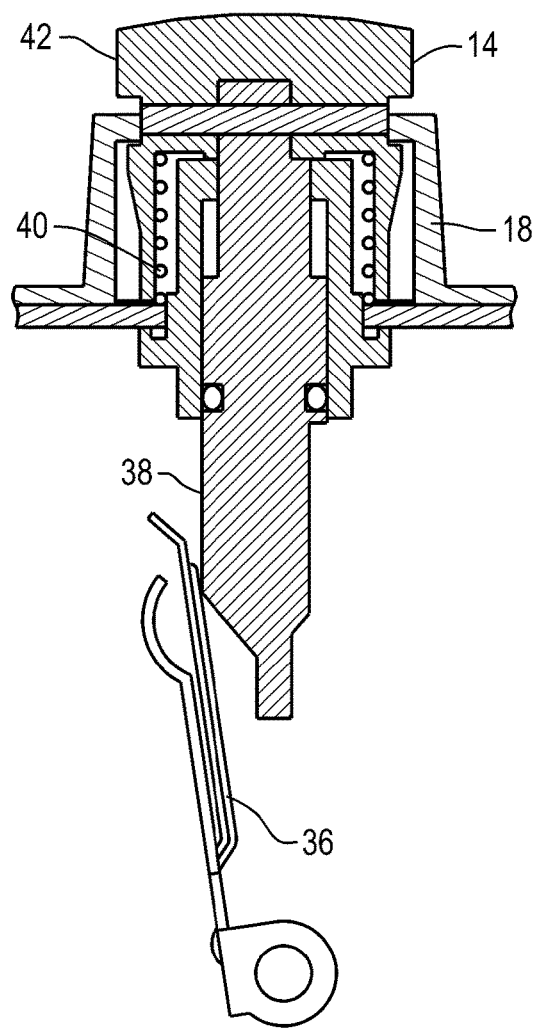
FIG. 5B is a sectioned side view of a portion of an emergency shut-off valve of the mechanical valve assembly of FIG. 1 in an OFF position to allow gas flow.

Now referring to FIGS. 5A-B with continued reference to FIGS. 3 and 4, emergency shut-off valve 14 is detailed. Emergency shut-off valve 14, located ahead of and similar to timer-controlled valve 16, is capable of operating in two modes: ON and OFF. As detailed above and seen in FIGS. 3, 4, and 5A, emergency shut-off valve 14 is in an ON position during normal operation; that is, emergency shut-off valve 14 in an ON position does not affect the operation of timer-controlled valve 16 to act as a primary valve in allowing gas to flow or stopping gas from flowing through mechanical valve assembly 10.

Emergency shut-off valve 14 includes shaft 38, spring 40, and knob 42. FIG. 5A shows a cross-section of emergency shut-off valve 14 in an ON position. In this position, spring plate 36 (also seen in FIGS. 3 and 4) is in a resting position with respect to shaft 38 of emergency shut-off valve 14 and seal 44 of shaft assembly 26; that is, it is proximate to but does not displace seal 44, thereby allowing timer-controlled valve 16 to determine whether or not gas is able to flow.

Figure 6:
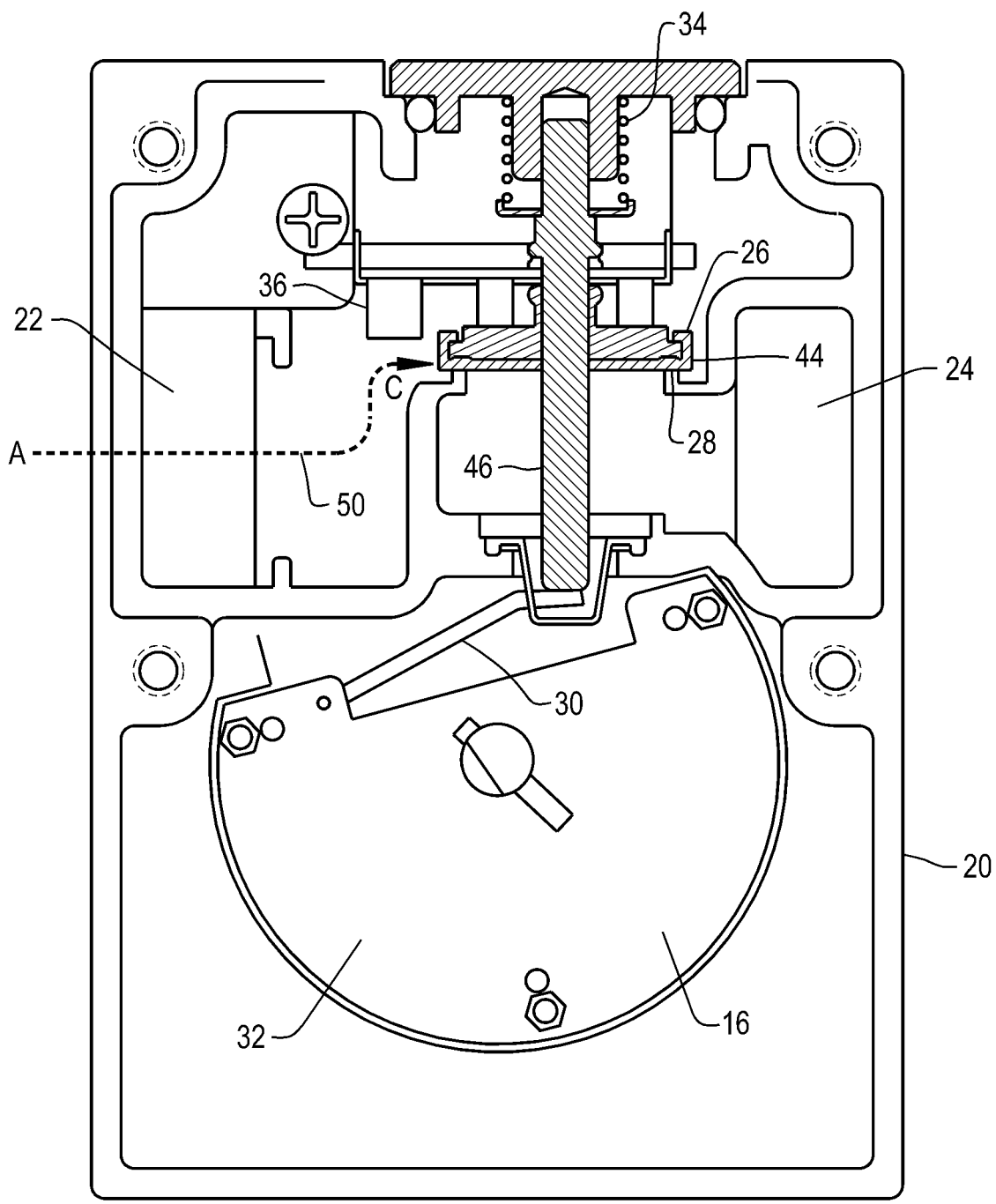
FIG. 6 is a top sectioned view of the mechanical valve assembly of FIG. 1 with selected components, showing an OFF condition with no gas flowing.

In contrast to the ON position of emergency shut-off valve 14 shown in FIG. 5A, emergency shut-off valve 14 is also capable of operating in an OFF mode as shown in FIG. 5B and now also referring to FIG. 6. As can be seen particularly in FIG. 5B, timer-controlled valve 16 is in an ON position. As emergency shut-off valve 14 is activated by pushing knob 42, spring 40 is compressed and shaft 38 displaces spring plate 36 in a pivotal manner. The displacement of spring plate 36, which had previously been proximate to but not displacing seal 44 of shaft assembly 26, now displaces seal 44 and seats it against seat 28 of base 20, thereby preventing gas flow from gas inlet port 22 to gas outlet port 24.

In addition to the above consequences of pushing knob 42 of emergency shut-off valve 14, it can also be seen in FIG. 5B that knob 42 is then captured by cover plate 18. In order to re-set emergency shut-off valve 14 (bring it back into an ON position) while timer-controlled valve 16 is in an ON position, knob 42 must be rotated. This rotation of knob 42 allows spring 40 to decompress, thereby urging shaft 38 upwards and consequently returning spring plate 36 to its neutral position, thereby allowing seal 44 to be unseated.

As previously disclosed, emergency shut-off valve 14 can also be used when timer-controlled valve 16 is in an OFF position. This prevents the operation of timer-controlled valve 16 until knob 42 is rotated as described above. Thus, emergency shut-off valve 14 can also function as a safety device.

While mechanical valve assemblies have been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of controlling a gas flow to a gas appliance, the method comprising:

providing a mechanical valve assembly for the gas appliance, the mechanical valve assembly including a housing, a gas inlet port associated with the housing, a gas outlet port associated with the housing, a timer-controlled valve operable to open and close the gas flow between the inlet port and outlet port, and a manually-operated emergency shut-off valve positioned between the inlet port and the outlet port, ahead of the timer-controlled valve relative to a direction of the gas flow through the mechanical valve assembly, and the timer-controlled valve and the emergency shut-off valve include a common shaft assembly that allows the gas flow when not seated and stops the gas flow when seated;

opening the gas flow with the timer-controlled valve; and
interrupting the gas flow with the emergency shut-off valve.

2. The method of claim 1, the method further comprising depressing and simultaneously turning the emergency shut-off valve to allow the gas flow.

3. The method of claim 1, wherein the emergency shut-off valve is operable to interrupt the gas flow between the inlet port and the outlet port after the gas flow has been opened by the timer-controlled valve.

4. The method of claim 1, wherein the emergency shut-off valve is operable to independently close the gas flow, regardless of whether the timer-controlled valve is in an open or closed state.

5. The method of claim 1, further comprising a step of depressing and simultaneously turning the emergency shut-off valve for opening the gas flow in between the inlet and outlet ports.

\* \* \* \* \*